US012528078B2

United States Patent
Ihara et al.

(10) Patent No.: US 12,528,078 B2
(45) Date of Patent: Jan. 20, 2026

(54) CATALYST FOR DECOMPOSITION OF HYDROCARBONS

(71) Applicant: IHARA CO., LTD., Aichi (JP)

(72) Inventors: Ryoseki Ihara, Aichi (JP); Hiroyuki Amano, Aichi (JP); Tsuyoshi Kobayashi, Aichi (JP)

(73) Assignee: IHARA CO., LTD., Aichi (JP)

( * ) Notice: Subject to any disclaimer, the term of this patent is extended or adjusted under 35 U.S.C. 154(b) by 762 days.

(21) Appl. No.: 17/771,009

(22) PCT Filed: Sep. 17, 2020

(86) PCT No.: PCT/JP2020/035210
§ 371 (c)(1),
(2) Date: Apr. 22, 2022

(87) PCT Pub. No.: WO2021/079660
PCT Pub. Date: Apr. 29, 2021

(65) Prior Publication Data
US 2022/0370987 A1     Nov. 24, 2022

(30) Foreign Application Priority Data

Oct. 23, 2019   (JP) .................................. 2019-192383
Apr. 1, 2020    (JP) .................................. 2020-065450

(51) Int. Cl.
*B01J 23/72*    (2006.01)
*B01J 23/745*   (2006.01)
(Continued)

(52) U.S. Cl.
CPC ............. *B01J 23/755* (2013.01); *B01J 23/72* (2013.01); *B01J 23/745* (2013.01); *C01B 3/26* (2013.01);
(Continued)

(58) Field of Classification Search
CPC ........ B01J 23/72; B01J 23/745; B01J 23/755; B01J 35/00; B01J 35/30; C01B 3/26
See application file for complete search history.

(56) References Cited

U.S. PATENT DOCUMENTS 3,876,456 A * 4/1975 Ford ....................... B01J 23/755
                                                       427/455
3,883,443 A * 5/1975 Nakamoto .............. C01B 21/02
                                                       502/331
(Continued)

FOREIGN PATENT DOCUMENTS

JP     H3260119 A     11/1991
JP     2001220103 A    8/2001
(Continued)

OTHER PUBLICATIONS

Office Action in JP application No. 2020-550889, mailed May 27, 2022, 15pp.
(Continued)

*Primary Examiner* — Cam N. Nguyen
(74) *Attorney, Agent, or Firm* — HAUPTMAN HAM, LLP

(57) ABSTRACT

A catalyst for decomposition of hydrocarbons is provided, the catalyst being resistant to deterioration of catalytic properties and suitable for producing hydrogen in a highly efficient manner for a long period. The catalyst includes a nickel-containing layer exposed on a support layer consisting of iron, cast iron, steel, copper, nickel, copper alloy or iron-nickel alloy. The catalyst for the decomposition of hydrocarbons is obtained by contacting the catalyst as a raw material with methane gas at an elevated temperature of 800° C. for 4 to 72 hours with an average residence time beyond 14 minutes. The catalyst may have an interlayer including copper between the support layer and the nickel-
(Continued)

containing layer, otherwise the support layer may be copper or copper alloy.

6 Claims, 9 Drawing Sheets

(51) Int. Cl.
*B01J 23/755* (2006.01)
*B01J 35/00* (2024.01)
*B01J 35/30* (2024.01)
*C01B 3/26* (2006.01)

(52) U.S. Cl.
CPC ........ *B01J 2235/00* (2024.01); *B01J 2235/15* (2024.01); *C01B 2203/0277* (2013.01); *C01B 2203/1023* (2013.01); *C01B 2203/1058* (2013.01); *C01B 2203/1076* (2013.01); *C01B 2203/1241* (2013.01)

(56) References Cited

U.S. PATENT DOCUMENTS

| | | | | |
|---|---|---|---|---|
| 3,886,095 | A * | 5/1975 | Ford | B01J 23/868 423/213.2 |
| 3,921,886 | A * | 11/1975 | Ford | B01D 53/86 148/536 |
| 3,928,234 | A * | 12/1975 | Ford | B01J 23/868 502/306 |
| 3,931,049 | A * | 1/1976 | Ford | C22C 19/007 502/241 |
| 3,978,005 | A * | 8/1976 | Kawagoshi | B01J 37/348 502/331 |
| 3,998,758 | A * | 12/1976 | Clyde | B01J 37/024 502/328 |
| 4,021,372 | A * | 5/1977 | Meguerian | B01D 53/9454 502/313 |
| 4,252,690 | A * | 2/1981 | Kamiya | B01D 53/885 502/313 |
| 4,900,483 | A | 2/1990 | Witzke et al. | |
| 5,010,050 | A * | 4/1991 | Wullenweber | H01M 4/8885 502/301 |
| 5,457,079 | A * | 10/1995 | Itabashi | B01J 37/0225 502/345 |
| 7,297,413 | B2 * | 11/2007 | Mitsumori | C23C 18/1879 428/630 |
| 7,504,719 | B2 * | 3/2009 | En | H05K 3/384 438/622 |
| 8,018,045 | B2 * | 9/2011 | En | H05K 3/385 438/622 |
| 8,030,577 | B2 * | 10/2011 | En | H05K 3/108 174/257 |
| 8,298,985 | B2 * | 10/2012 | Morgenstern | C07F 9/3813 502/301 |
| 8,758,959 | B2 * | 6/2014 | Mei | H01M 4/926 429/405 |
| 11,033,882 | B2 * | 6/2021 | Ha | B01J 37/04 |
| 11,801,495 | B2 * | 10/2023 | Ha | B01J 23/755 |
| 2013/0244866 | A1 * | 9/2013 | Najbar | B01J 23/8892 502/241 |

FOREIGN PATENT DOCUMENTS

| | | |
|---|---|---|
| JP | 200354904 A | 2/2003 |
| JP | 200395605 A | 4/2003 |
| JP | 200459340 A | 2/2004 |
| JP | 2004261771 A | 9/2004 |
| JP | 200558908 A | 3/2005 |
| JP | 201934259 A | 3/2019 |

OTHER PUBLICATIONS

Written Opinion in PCT/JP2020/035210, mailed Nov. 10, 2020. 4pp.
Kiyoshi Otsuka et al., "Production of Hydrogen through Decomposition of Methane with Ni—supported Catalysts", The Chemical Society of Japan, Chemistry Letters vol. 28, Jul. 21, 1999, No. 11, p. 1179-1180, 2pp.
International Search Report in PCT/JP2020/035210, mailed Nov. 10, 2020. 5pp.

* cited by examiner

Data obtained in residence-type small reactor
Catalyst with a size of 0.35*30*300, two sheets
Methane flow rate: 10 mL/m, 0.2 MPa
Reactor temp.: 800°C*8 hours/day
Test period: 4 days Data obtained in residence-type small reactor
Catalyst with a size of 0.35*30*300, two sheets
Methane flow rate: 10 mL/m, 0.2 MPa
Reactor temp.: 800°C*8 hours/day
Test period: Four days Data obtained in residence-type small reactor
Catalyst with a size of 0.35*30*300, two sheets
Methane flow rate: 10 mL/m, 0.2 MPa
Reactor temp.: 800°C*8 hours/day
Test period: 9 days

CATALYST FOR DECOMPOSITION OF HYDROCARBONS

RELATED APPLICATIONS

The present application is a National Phase of International Application No. PCT/JP2020/035210 filed Sep. 17, 2020, which claims priority to Japanese Application Nos. 2019-192383, filed Oct. 23, 2019, and 2020-065450, filed Apr. 1, 2020.

TECHNICAL FIELD

The present disclosure relates to a catalyst for the decomposition of hydrocarbons.

BACKGROUND

For years, nickel is known as a catalytic metal to be used for the production of hydrogen gas by methane direct decomposition. To prevent aggregation due to the sintering of nickel fine particles in a high-temperature reaction of methane direct decomposition, what is proposed includes: nickel supported on a silica (Patent Document 1, Non-Patent Document 1), on a zeolite (Patent Document 2, Patent Document 3) and on a titania (Patent Document 4).

There is an inevitable problem, however, that carbon produced in methane decomposition physically covers an active site of a catalyst, and nickel fine particles aggregates due to sintering, thereby deactivating the catalyst.

To avoid the early-stage inactivation of nickel catalyst, there have been various proposals for catalyst since the late 2000s.

For example, proposed is a carrier in which a carbon particle is interposed between nickel particles without the use of carrier (Patent Document 5). It allegedly achieves such a high conversion rate that maintains the conversion rate of methane as high as 50% at a temperature of 500° C., 65% at 600° C. and reaches a thermodynamically equilibrium conversion rate as high as about 90% in an initial stage at 800° C. It only demonstrates a continuous operation time of about several hours. The catalyst deteriorated as time proceeds needs to be recycled through acid treatment and sintering. Besides, there is a catalyst bearing a catalytic material on a porous carrier that is expandable into a similarity shape (Patent Document 6). It discloses stably conducting the direct composition for a long period at a conversion rate of about 60%, and allowing for the generation of hydrogen for about 10 hours, which ultimately requires the cartridge exchange.

PRIOR ART DOCUMENT

Patent Literature

[Patent Document 1] Japanese Unexamined Patent Application Publication No. 2001-220103

[Patent Document 2] Japanese Unexamined Patent Application Publication No. 2003-95605

[Patent Document 3] Japanese Unexamined Patent Application Publication No. 2003-54904

[Patent Document 4] Japanese Unexamined Patent Application Publication No. 2004-59340

[Patent Document 5] Japanese Unexamined Patent Application Publication No. 2004-261771

[Patent Document 6] Japanese Unexamined Patent Application Publication No. 2005-058908

Non-Patent Literature

[Non-Patent Literature 1] Chemistry Letters Vol. 28 (1999) No. 11 p. 1179-1180

SUMMARY

In view of the above current situation, an object of the present disclosure is to provide a catalyst for the decomposition of hydrocarbons that is hard to cause the deterioration of catalytic properties and suitable for producing hydrogen in a highly efficient manner for a long period.

An aspect of the present disclosure for helping to achieve the above goal is a catalyst for the decomposition of hydrocarbons, comprising a nickel-containing layer exposed on a support layer consisting of iron, cast iron, steel, copper, nickel, copper alloy or iron-nickel alloy. Such catalyst may vary catalytic ability by selecting the above species as metal or alloy species of the support layer.

The above catalyst for the decomposition of hydrocarbons may comprise an interlayer comprising copper between a substrate and a nickel-containing layer. In at least one embodiment, the catalyst may include a copper substrate or a copper alloy substrate. In the above configuration, the hydrogen production efficiency tends to be improved compared to the case where a layer comprising copper is not formed, or a case where copper substrate or copper alloy substrate is not used.

The catalyst for the decomposition of hydrocarbons may be obtained by subjecting a surface of said support layer to copper plating, subjecting the copper-plated surface to a diffusion treatment in vacuum, nitrogen gas or argon gas and forming said nickel-containing layer, or subjecting a surface of said support layer consisting of nickel or iron-nickel alloy to copper plating and subjecting the copper-plated surface to a diffusion treatment in vacuum, nitrogen gas or argon gas. In the above configuration, a plated copper diffuses into an inside of the support layer, which consequently results in the appearance of a nickel-containing layer on an exposed surface, or even in a case where the plated copper remains on a surface, the additional formation of the exposed nickel-containing layer tends to improve the hydrogen production efficiency.

In the above catalyst for the decomposition of hydrocarbons, the interlayer comprising copper may have a thickness of 1 to 1000 μm. Should the thickness of the layer comprising copper fall within the above range, the layer is hard to be melted through continuous operation at 800° C., and the catalytic ability may be improved.

Another aspect of the present disclosure for achieving the above goal is a catalyst for the decomposition of hydrocarbons obtained by contacting said catalyst for the decomposition of hydrocarbons having any one of the above features as a raw material with methane gas at an elevated temperature of 800° C. for 4 to 72 hours with an average residence time beyond 14 minutes. In at least one embodiment, the average residence time is 30 minutes or more. In at least one embodiment, the average residence time is 120 minutes or less. A treatment in the above condition tends to cause the improved catalytic performance and the constant hydrogen production efficiency.

Effect of the Invention

The present disclosure allows us to obtain a highly-efficient catalyst for the decomposition of hydrocarbons that is hard to cause the deterioration of the catalyst over a long period.

BRIEF DESCRIPTION OF THE DRAWING(S)

DETAILED DESCRIPTION OF THE PREFERRED EMBODIMENTS

Figure 1:
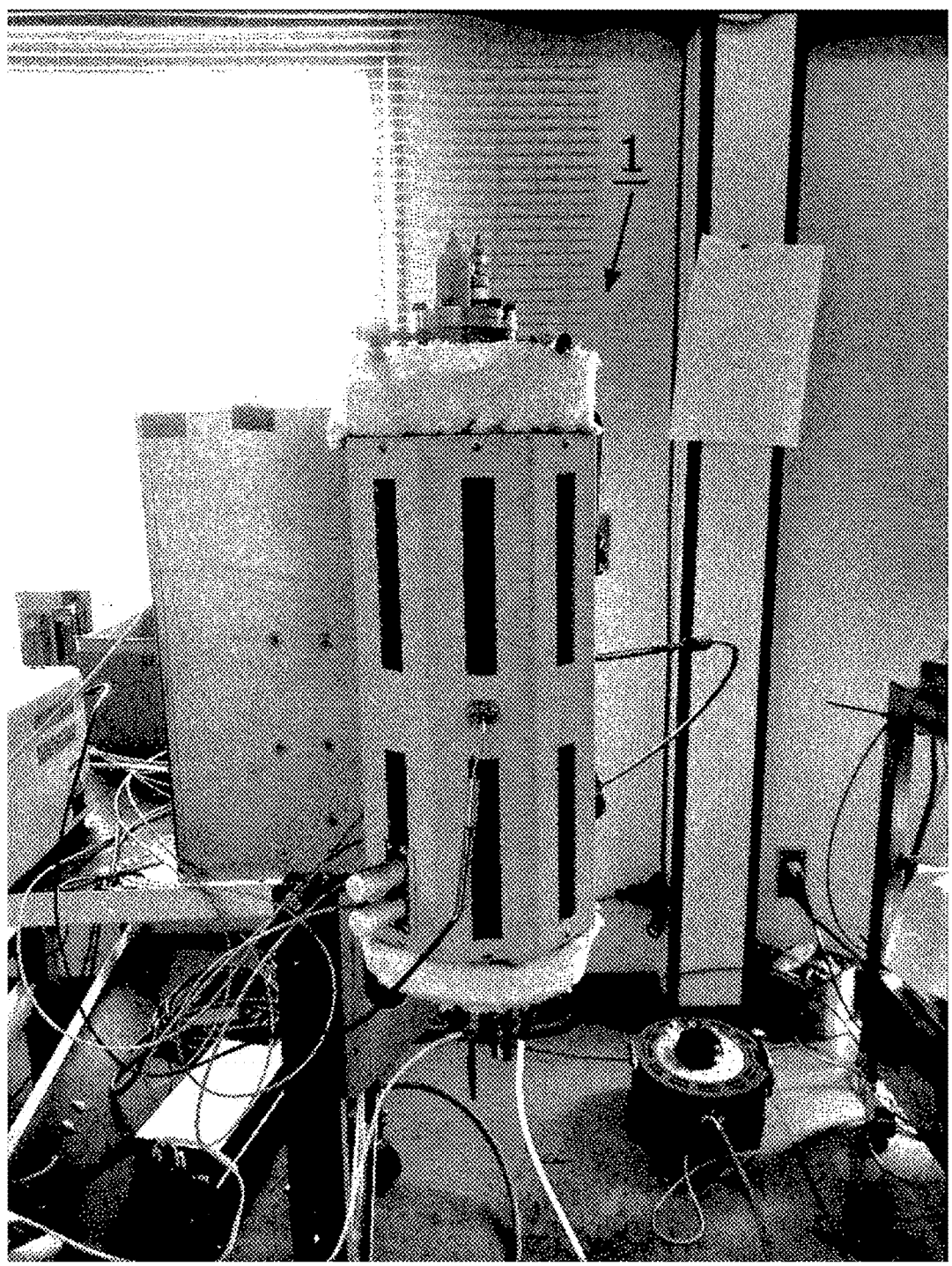
FIG. 1 is a picture showing one embodiment of catalyst testing apparatus containing catalyst for the decomposition of hydrocarbons according to at least one embodiment.

An explanation is given to the embodiments of the present disclosure in reference to the following drawings.

The catalyst for the decomposition of hydrocarbons of the present disclosure may comprise an exposed nickel-containing layer. The "nickel-containing layer" means a layer comprising a nickel-containing composition as a catalytic component. Nickel-containing components may be elemental nickel or nickel alloy, and may contain, in addition to nickel, one or more elements selected from Cu, Rh, Ru, Ir, Pd, Pt, Re, Co, Fe, Cr, Al, Mo, Nb, Ti, W, Ta, P. Further, "exposed nickel-containing layer" means a nickel-containing layer with which hydrocarbon reactant may contact, and is not limited to a nickel-containing layer that is exposed by sight.

The nickel-containing layer may be an exposed, unsupported-type nickel-containing layer. "Unsupported" means that a catalytic component of a nickel-containing composition is not present as a particle distributed on a porous support such as active carbon and porous oxide, but is mutually structurized and present. "Structurized" may include a state where particles are welded in a partial region, a state where particles are welded in a whole region, or a state where particles are melted as a whole and then cooled and solidified. In some embodiments, nickel-containing layer may be structurized on the order of mm. In some embodiments, nickel-containing layer may be structurized on the order of µm. In some embodiments, nickel-containing layer may be structurized on the order of nm. Further, "exposed, unsupported nickel-containing layer" means a unsupported nickel-containing layer with which hydrocarbon reactant may contact, and is not limited to a nickel-containing layer that can be seen as being exposed by sight. In some embodiments, nickel-containing layer may be a nickel-containing plated layer or nickel-containing sprayed layer.

Nickel-containing layer may have a thickness of 5 µm to 200 µm. If thicker than 200 µm, it may cost too much for the purpose of improving catalytic performance.

The method for forming a nickel-containing layer may include a publicly-known forming method such as electrolytic plating, non-electrolytic plating, immersion plating and vacuum deposition method.

The condition for electrolytic plating may be a common condition to be used for nickel-plating to automobile parts.

A catalyst for the decomposition of hydrocarbons of the present disclosure is a catalyst that comprises iron, copper, nickel, steel, cast iron, iron-nickel alloy or copper alloy as a support layer of the nickel-containing layer.

"Support layer" used herein means a layer that can be a base for laying a nickel-containing layer. Therefore, the support layer does not necessarily get in direct contact with the nickel-containing layer, but may be formed with one or two or more interlayers being interposed between the support layer and the nickel-containing layer. The support layer may be a substrate itself (that can be the below-mentioned structure in some cases) before laying a nickel-containing layer, or a layer on the substrate.

Iron means elemental iron or iron alloy having a carbon content of less than about 0.02%.

Steel means an iron alloy having a carbon content from about 0.02 to 2.14%. Steel is not particularly limited, but may include, for example, mild steels (SPC), carbon tool steels, alloy tool steels and stainless steels.

Cast iron means an iron alloy having a carbon content beyond about 2.14%.

Copper alloy means the one in which one kind or more metal elements and/or non-metal elements are added to copper, including, for example, a copper-nickel alloy such as constantan and monel metal, an alloy comprising copper, nickel and the other component such as albata and cupronickel, an alloy comprising copper and an element other than nickel such as brass. It may also contain a transition element such as chrome, molybdenum and cobalt.

Iron-nickel alloy means an alloy of iron and nickel, or a material which contains iron, nickel and optionally one kind or more metal elements and/or non-metal elements. Iron-nickel alloy may include, for example, permalloy and umber, and may also contain chrome, molybdenum and cobalt. Permalloys may include permalloys having a nickel content greater than an iron content (e.g. permalloy A, permalloy C referred by JIS standard) as well as a part of permalloys containing more iron than nickel (e.g. permalloy B and permalloy D referred by JIS standard). For reference, the compositions of typical permalloys are shown as below:

TABLE 1

| JIS grade | % Ni | % Cu | % Mo | Fe |
|---|---|---|---|---|
| Permalloy A | 78.5 | — | — | Balance |
| Permalloy B | 42~49 | — | — | Balance |
|  | 75~78 | 4~6 | — | Balance |
| Permalloy C | 75~80 | 1~6 | 3~5 | Balance |
|  | 79~82 | — | 3.5~6 | Balance |
| Permalloy D | 36 | — | — | Balance |

Further, in a case where the catalyst for the decomposition of hydrocarbons of the present disclosure is elemental nickel, copper-nickel alloy or iron-nickel alloy, the catalyst for the decomposition of hydrocarbons of the present disclosure may be elemental nickel, copper-nickel alloy or iron-nickel alloy itself in which a nickel-containing layer and a support layer are integrated, or a layer comprising a nickel-containing composition having a composition different from a support layer on the support layer selected from elemental nickel, copper-nickel alloy or iron-nickel alloy.

A support layer may be selected as necessary in terms of the heat resistance and processibility of a substrate in a case where the support layer is the substrate, and may usually have a thickness of 0.5 mm to 10 mm.

The catalyst for the decomposition of hydrocarbons of the present disclosure may include an interlayer comprising copper between a support layer and a nickel-containing layer.

The interlayer comprising copper means a layer consisting of elemental copper or copper alloy which is clearly distinguished from a support layer or a nickel-containing layer in terms of the composition. Copper alloy may contain, in addition to copper, one or more elements selected from Zn, Al, Sn and Ni.

The interlayer comprising copper may have a thickness of 1 to 1000 µm. If thinner than 1 µm, it may be easily melted, so that it may not be durable at a reaction temperature of about 800° C. On the other hand, if thicker than 1000 µm, it may cost too much for the purpose of improving catalytic performance. In at least one embodiment, the lower-limit of the thickness of the interlayer is 1.5 µm. In at least one embodiment, the lower-limit of the thickness of the interlayer is 2 µm. In at least one embodiment, the upper limit of the thickness of the interlayer is 500 µm. In at least one embodiment, the upper limit of the thickness of the interlayer is 200 µm.

A method for forming an interlayer comprising copper may include publicly-known forming methods such as plating (electrolytic plating, non-electrolytic plating), spraying (plasma spraying, cluster ion beam, gas deposition, CS method, WS method, high-velocity solid particulate deposition). Generally in a case where a thin layer is allowable, electrolytic plating may be utilized, whereas plasma spraying may be utilized in a case where a thick layer is preferable.

The condition for electrolytic plating may be a common condition to be used for copper plating on automobile parts.

The condition for plasma spraying may be a common condition to be used for plasma spraying on automobile parts.

The catalyst for the decomposition of hydrocarbons of the present disclosure may be obtained by subjecting a surface of said support layer to copper plating, subjecting the copper-plated surface to a diffusion treatment in vacuum, nitrogen gas or argon gas and forming said nickel-containing layer, or subjecting a surface of said support layer consisting of nickel or iron-nickel alloy to copper plating and subjecting the copper-plated surface to a diffusion treatment in vacuum, nitrogen gas or argon gas. Diffusion treatment may be conducted with a publicly-known method, temperature and time. The condition is not particularly limited, as long as a plated copper may diffuse into a support layer to have a nickel-containing layer emerge on an exposed surface as a consequence, or an exposed nickel-containing layer may be separately formed, even if a plated copper remains on a surface. Also in a case where the catalyst for the decomposition of hydrocarbons is obtained by this method, it is not always necessary to form a distinct interlayer comprising copper.

Instead of copper plating and diffusion treatment, it may also be an alternative to subject a surface of the support layer consisting of nickel or iron-nickel alloy to a copper ion implantation, while it costs too much.

Except for the case where the catalyst for the decomposition of hydrocarbons of the present disclosure is elemental nickel, copper-nickel alloy or iron-nickel alloy, the combination of each layer is not particularly limited in a case where a distinct layer is formed, but may include, for example, Fe/Cu/Ni, Fe/X/Cu/Ni, cold rolled steel sheet (SPC)/Ni, SPC/Cu/Ni, carbon tool steel (SK5)/Ni, high tensile steel/Ni, permalloy/Ni, permalloy/Cu/Ni, permalloy/X/Cu/Ni, permalloy/Cu/X/Ni, constantan/Ni, constantan/X/Ni, Cu/Ni, Cu/X/Ni, Ni/Cu/Ni, Ni/X/Cu/Ni, Ni/Cu/X/Ni in the order of support layer/superficial layer, support layer/interlayer/superficial layer or support layer/first interlayer/second interlayer/superficial layer. X is a layer consisting of one or more elements other than Cu or Ni selected from Zn, Sn, Rh, Ru, Ir, Pd, Pt, Re, Co, Fe, Cr, Al, Mo, Nb, Ti, W, Ta, P etc.

The catalyst for the decomposition of hydrocarbons of the present disclosure may be a structural catalyst. The use of a structural catalyst facilitates the separation of a solid product compared to a powder catalyst and allows us to utilize a variety of methods for the separation method even in a case that the adhesion of the solid product in a direct decomposition reaction of hydrocarbons should result in the decreased catalytic performance of a nickel-based metal.

The "structural catalyst" used herein is a catalyst in which a structure selected from a particle, a sheet, a porous body, a felt, a mesh, a fabric or an expanded metal itself serves as a catalyst, or a structure-based catalyst. The structure-based catalyst generally refers to the one that immerses a substrate having a honeycomb geometry etc. into a slurry comprising a catalytic component. For the purpose of the present disclosure, as aforementioned, it is preferable to form an exposed, unsupported catalyst layer (plate layer, spraying layer) on the structure by spraying and plating etc.

Particle has a diameter of 0.1 to 30 mm, In at least one embodiment, the diameter is from 1 to 30 mm. In at least one embodiment, the diameter is from 5 to 30 mm.

Plate may be formed into a single layer, otherwise a laminated plate made of two or more layers consisting of different materials.

Porous body is a porous body having continuous pores. In at least one embodiment, a porous body may have a three-dimensional network structure. In at least one embodiment, the pore size is 300 to 4000 μm. In at least one embodiment, the pore size is 1100 to 4000 μm. The porosity may be 80% or more. In at least one embodiment, the porosity is 90% or more. In at least one embodiment, the porosity is 95% or more. The specific surface area may be 200 $m^2/m^3$ to 6000 $m^2/m^3$. In at least one embodiment, the specific surface area is 500 $m^2/m^3$ to 8500 $m^2/m^3$.

Representative porous body may include Celmet (registered trademark) by Sumitomo Electric Industries.

A felt is obtained by subjecting fibrous constituent materials to random entanglement and in some instances, sintering, which may include needle punched web and fibrous sintered body. A needle punched web and fibrous sintered body may have a fibrous diameter of 10 to 150 μm, a porosity of about 50 to 80%, a weight of 50 to 50,000 $g/m^2$, and a thickness of 0.1 mm to 5.0 mm.

A mesh may be woven by any method including plain weave or twill weave, or knitted by any method including weft-knitting or warp-knitting by use of fibrous constituent materials, and causing the intersections to be adhered. Preferably-used mesh has a line diameter of 30 to 800 μm and a mesh number of 5 to 300 per inch.

A fabric is a knit connecting meshes to each other by an optional stitch.

An expanded metal is obtained by making cut lines in a metal plate at a predetermined interval in houndstooth pattern by a special machine and expanding the cut lines to form rhombic-shaped or testudinate meshes. Mesh size usually has a SW of 25 mm to 130 mm and a LW of 20 mm to 320 mm. Strand size has a plate thickness of 1 mm to 8.5 mm and a W of 1.2 mm to 9.5 mm.

The structure may be one kind of the species listed above, or a composite structure combining two kinds or more.

A method for producing the foregoing structural catalyst may include the process to subject an original structure to blast processing. Structural catalyst may be produced by laminating a layer comprising nickel on a surface of an original structure usually by porous electroplating or nickel plating should the original structure be made of non-nickel metal. Subsequently followed by blasting as necessary, a structural catalyst having a porous surface may be produced. On the other hand, if the original structure consists of nickel-based metal, a structural catalyst having a porous surface may be produced by blasting. If the original structure is a nickel-aluminum alloy, a method of alkali dissolution treatment may be used.

Hydrocarbons subjected to a direct decomposition or a steam modification by the catalyst for the decomposition of hydrocarbons of the present disclosure may include: aliphatic hydrocarbons such as methane, ethane, ethylene and propane: cyclic aliphatic hydrocarbon such as cyclohexane and cyclopentane; and aromatic hydrocarbons such as benzene, toluene and xylene. In some embodiments, hydrocarbons is a linear aliphatic hydrocarbons. In some embodiments, hydrocarbons is methane, ethane and propane. In some embodiments, hydrocarbons is methane.

A catalyst for the decomposition of hydrocarbons may be obtained by contacting a raw material of said catalyst for the decomposition of hydrocarbons having at least one feature mentioned above with methane gas at an elevated temperature of 800° C. for 4 to 72 hours with an average residence time beyond 14 minutes and 120 minutes or less. If the average residence time is 14 minutes or less, the obtained catalyst may not have a surface structure having a high catalytic activity in some cases, whereas even if it goes beyond 120 minutes, it may not be advantageous in terms of the productivity of the catalyst for the decomposition of hydrocarbons. In at least one embodiment, the lower limit of the contact time with methane gas is 6 hours. In at least one embodiment, the lower limit of the contact time 7 hours. In at least one embodiment, the upper limit of the contact time is 42 hours. In at least one embodiment, the lower limit of the average residence time is 30 minutes. In at least one embodiment, the average residence time is 57 minutes.

Hereinafter, a detailed discussion is given to the examples of an apparatus utilizing the aforementioned structural catalyst.

Example 1—Temperature Elevating Experiment Using a Pure Nickel Plate

Figure 2:
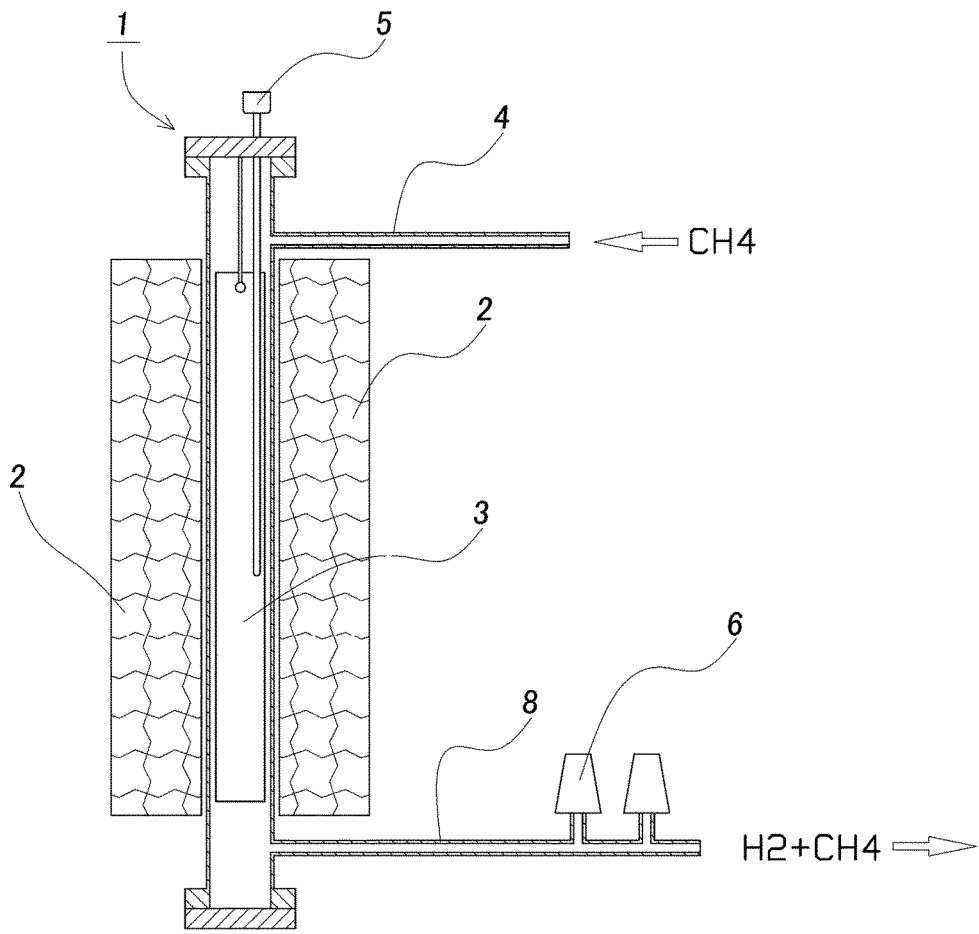
FIG. 2 is a schematic drawing showing one embodiment of catalyst testing apparatus containing catalyst for the decomposition of hydrocarbons according to at least one embodiment.
Figure 3A:
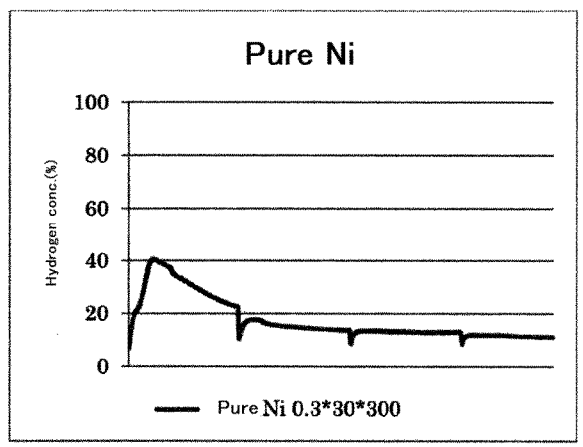
FIG. 3A is a graph showing a time course of catalyst performance of a pure Ni sheet.
Figure 3B:
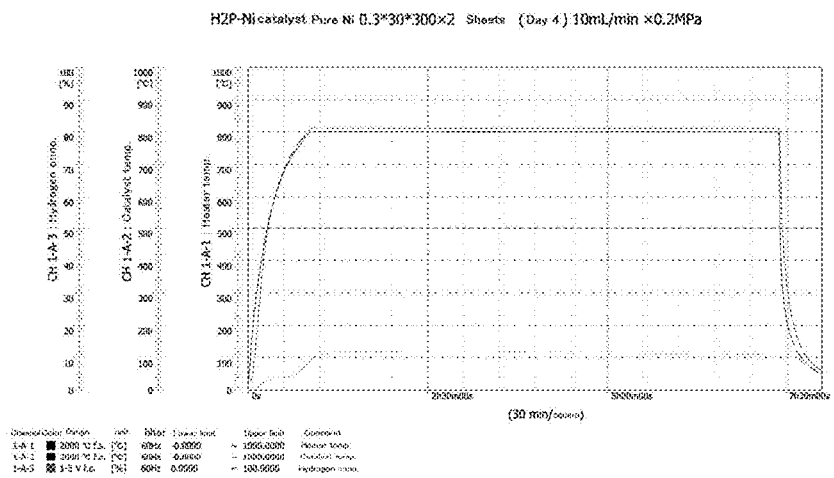
FIG. 3B is a graph showing a result of data logger on the final date of a pure Ni sheet.

A cylindrical, residence-type small reactor 1 made of SUS304 shown in FIG. 1 (Volume: about 570 $cm^3$) was surrounded by heater 2 (Product number: FPS-100, control type: PID, manufacturer: Full-tech Co. Ltd.) of FIG. 2 and hanging two pure nickel sheet catalysts 3 having a thickness of 0.35 mm, a width of 30 mm and a length of 300 mm (product number: K14062, ASTM B 162 and JIS H 4551 compliant, water quenched at 900° C. for one minute) from the upper end of the reactor with a gap of 2 mm. While introducing methane at a pressure of 0.2 MPa and a flow rate of 10 mL/min from methane supplying pipe 4 near the upper end of side wall of the reactor so as to form a flow parallel to the sheet catalysts, the reactor temperature was elevated. After the temperature reached 800° C., the direct decomposition reaction was performed for consecutive eight hours per day over four days in total. The temperature was constantly monitored by thermocouple 5 inserted to penetrate the upper lid of the reactor and reach the reactor core. The hydrogen concentration was monitored by installing the gas thermal conduction-type gas analyzer 6 (zero gas: city gas 13A, span gas: 100% hydrogen, gas flow rate: 1.0 L/min, manufactured by CHINO Corporation) on the discharging pipe of produced gas 8 disposed in the bottom end of the side wall of the reactor for discharging a produced gas in the air. The result is shown in FIG. 3A and FIG. 3B. As is evident from FIG. 3B, for safety, the reactor center was cooled every day after 8-hour continued operation. On the next day, the reactor was heated again from a room temperature to 800° C. As a consequence, it was found that the hydrogen production efficiency of nickel sheet catalyst decreased to about 11% on Day 4 in terms of hydrogen gas concentration.

Example 2—A Test of the Change in the Catalyst Performance of Hastelloy

A Ni alloy of Hastelloy (Product number: Alloy C-276, manufactured by ThyssenKrupp) was made into a sheet catalyst. The hydrogen production efficiency was kept at 10% with almost no variation for a test period of three days.

Example 3—A Test of the Change in the Catalyst Performance of a Ni-Plated SPC

Figure 4A:
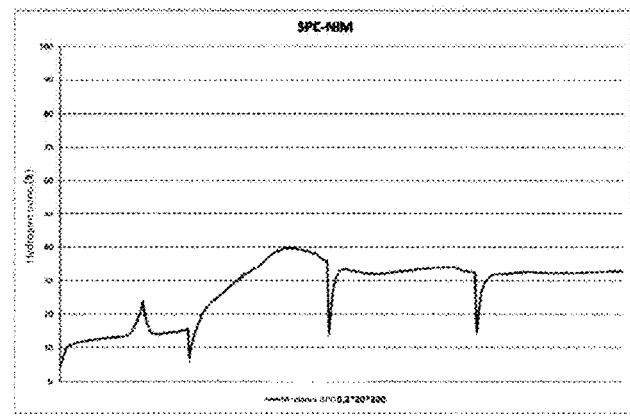
FIG. 4A is a graph showing a time course of catalyst performance of a Ni-plated SPC sheet.
Figure 4B:
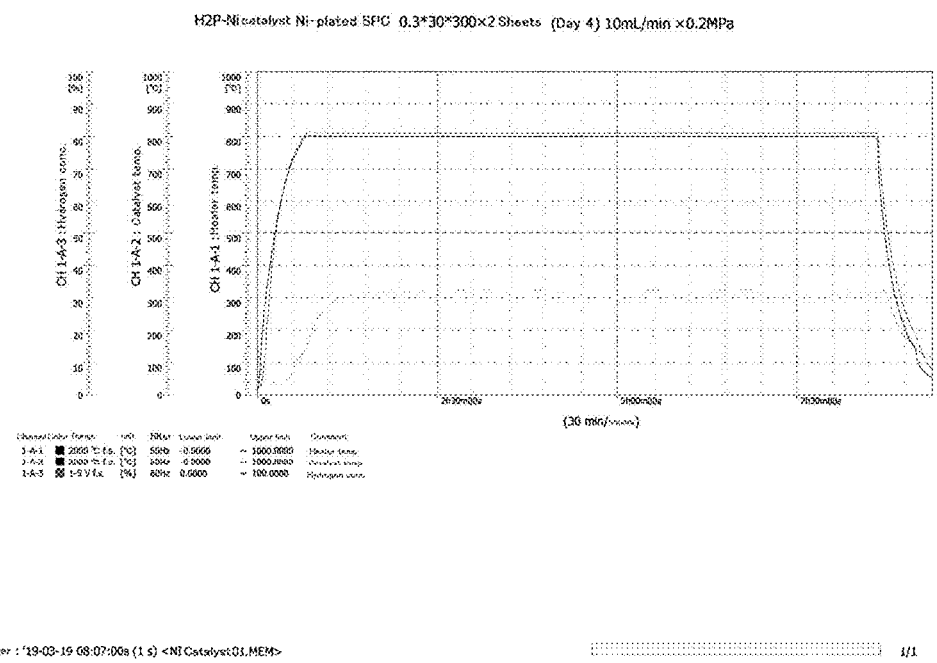
FIG. 4B is a result of data logger on the final date of a Ni-plated SPC sheet.

By use of a cold roll steel sheet free of carbon (Product number: COLD ROLLED STEEL SHEET IN COIL DULL FINISHED, manufactured by JFE Steel Corporation) subjected to Ni plating (10μ-thick) as a sheet catalyst, the hydrogen production efficiency was investigated in a condition similar to Example 1. The result is shown in FIG. 4A and FIG. 4B. The hydrogen production efficiency has converged to 32.5% in four days.

Figure 5A:
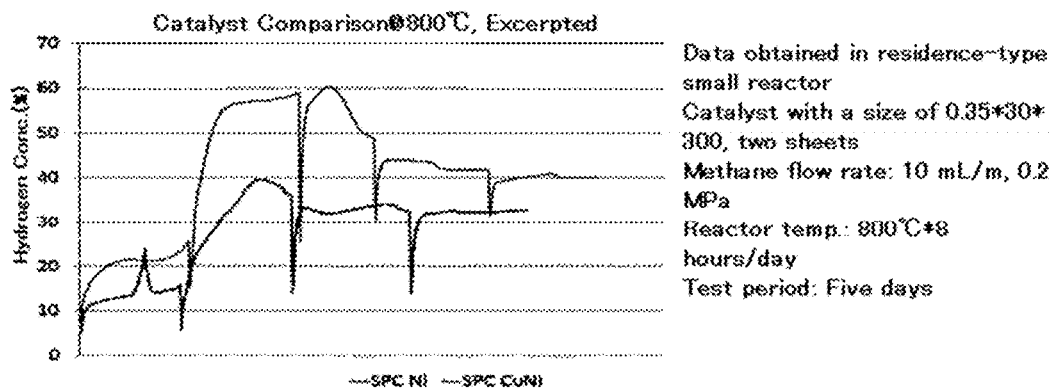
FIG. 5A is a graph showing a time course of catalyst performance of a sheet subjected to Ni-plating after laying an interlayer formed by Cu-plating on SPC.
Figure 5B:
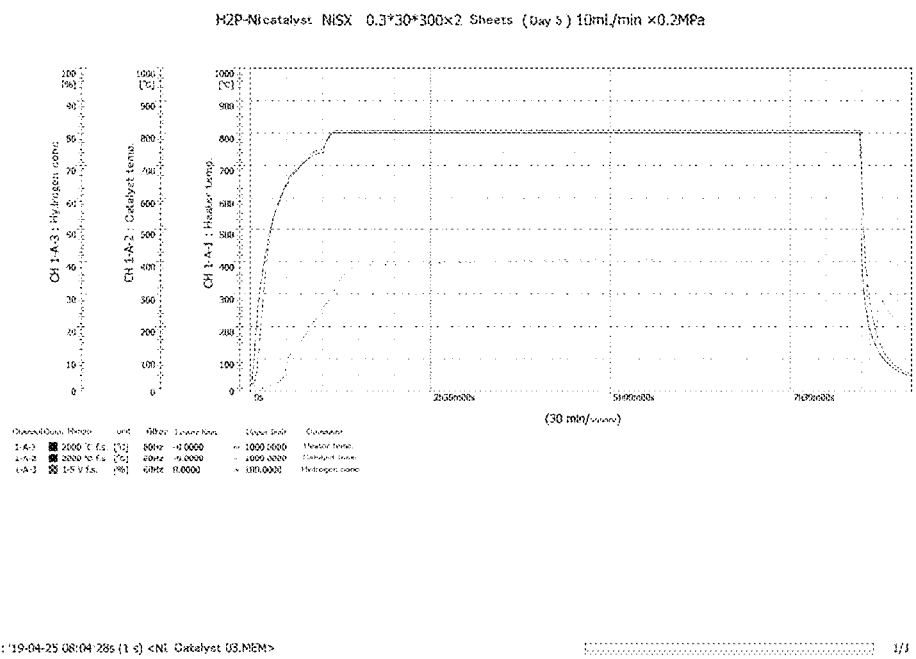
FIG. 5B is a result showing a result of data logger on the final date of a sheet subjected to Ni-plating after laying an interlayer formed by Cu-plating on SPC.

Example 4—A Test of the Change in the Catalyst Performance of a Catalyst Obtained by Laying an Interlayer of Cu Plating on SPC and Subjecting the Cu-Plated SPC to Ni Plating Subjecting a cold rolled steel sheet used in Example 3 to Cu plating for the formation of an interlayer (film thickness: 2 to 3 μm), which was followed by Ni plating in a condition similar to Example 3, the hydrogen production efficiency of the obtained sheet catalyst was investigated in a condition similar to Example 1. The result is shown in FIG. 5A and FIG. 5B. The hydrogen production efficiency has converged to 40% in five days.

Looking into the time course of hydrogen concentration in reference to the above FIG. 4 and FIG. 5, elementary substance materials such as Ni (Example 1) showed the decrease in hydrogen production efficiency as time goes by, whereas the hydrogen production efficiency was maintained in a case that the iron of soft steel without catalytic activity was used for a support layer and subjected to Ni plating (Example 3). Furthermore, in a case where an interlayer comprising copper is disposed (Example 4), the improvement on the hydrogen production efficiency was observed compared to the case without the interlayer.

Figure 6A:
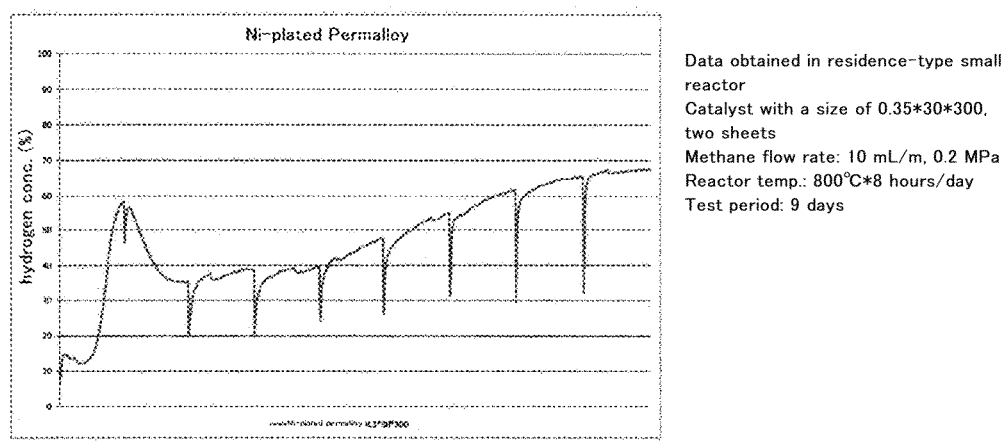
FIG. 6A is a graph showing a time course of catalyst performance of a Ni-plated permalloy sheet.
Figure 6B:
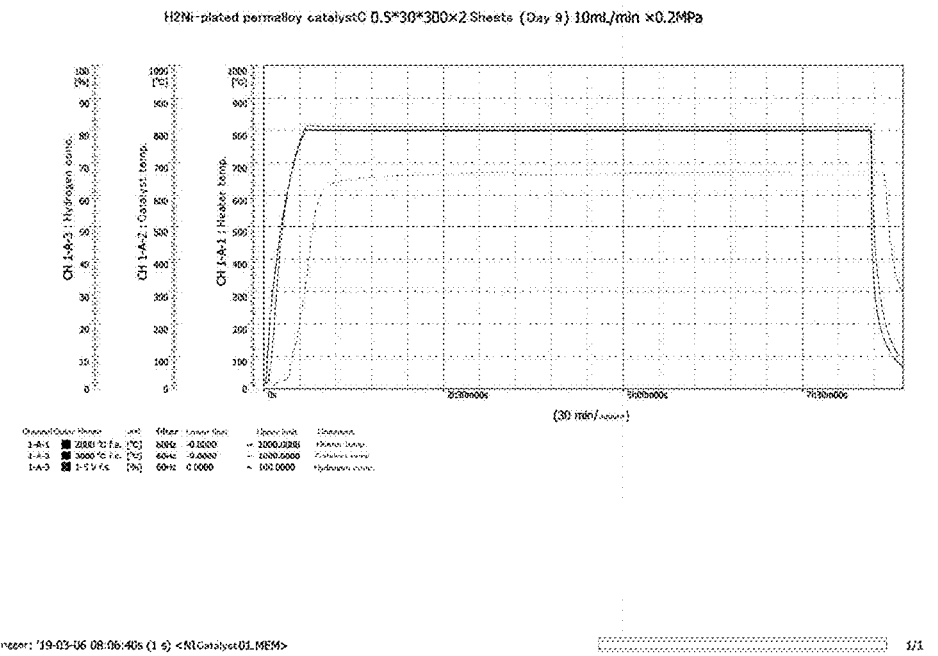
FIG. 6B is a result of data logger on the final date of a Ni-plated permalloy sheet.

Example 5—A Test of the Change in the Catalyst Performance of a Ni-Plated Permalloy By use of permalloy (Permalloy B, YFN-45-R, Ni content 45%, manufactured by DOWA METAL CO., LTD.) subjected to Ni plating in a condition similar to Example 3 as a sheet catalyst, the hydrogen production efficiency was investigated in a condition similar to Example 1. The result is shown in FIG. 6A and FIG. 6B. The hydrogen production efficiency has increased up to 68% in nine days. As seen above, it was found that the hydrogen production efficiency was improved as time goes by even in a case where an iron-nickel alloy of permalloy was used as a support layer.

Figure 7A:
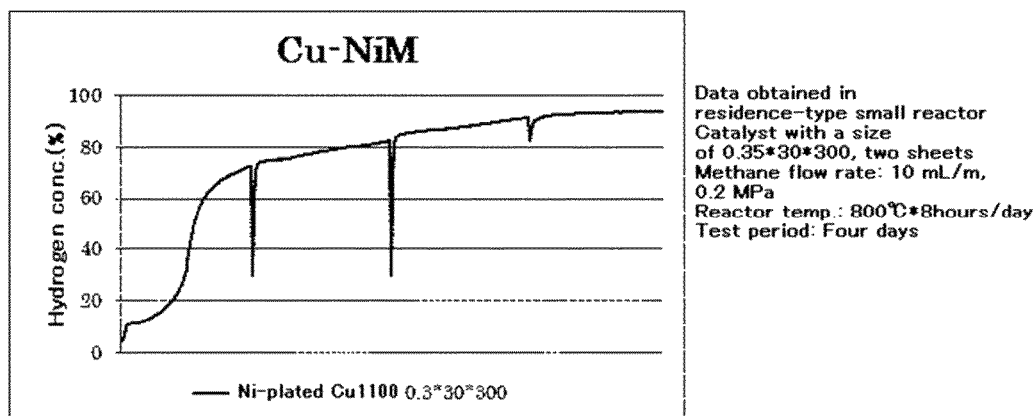
FIG. 7A is a graph showing a time course of catalyst performance of a Ni-plated Cu sheet.
Figure 7B:
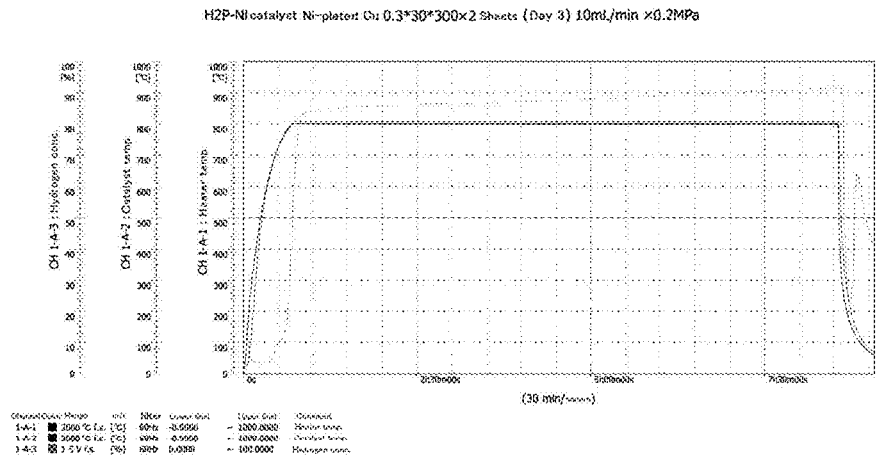
FIG. 7B is a result of data logger on Day 3 of a Ni-plated Cu sheet.

Example 6—A Test of the Change in the Catalyst Performance of a Ni-Plated Cu Support Layer By use of Cu (1100) subjected to Ni plating in a condition similar to Example 3 as a sheet catalyst, the hydrogen production efficiency was investigated in a condition similar to Example 1. The result is shown in FIG. 7A and FIG. 7B. The hydrogen production efficiency has converged to 93.8% in four days. This result was almost comparable to the theoretical value.

Example 7—A Test of the Change in the Catalyst Performance of Constantan

Figure 8:
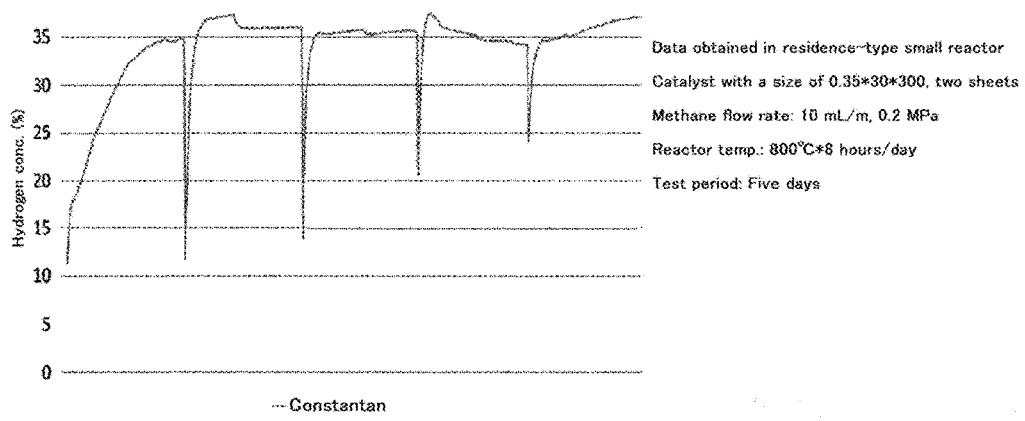
FIG. 8 is a graph showing a time course of catalyst performance of a constantan sheet.

By use of constantan (Product number: CN-49, manufactured by Daido Steel Co., Ltd.) as a sheet catalyst, the hydrogen production efficiency was investigated in a condition similar to Example 1. The result is shown in FIG. 8. The hydrogen production efficiency has increased up to 37% in five days.

Figure 9A:
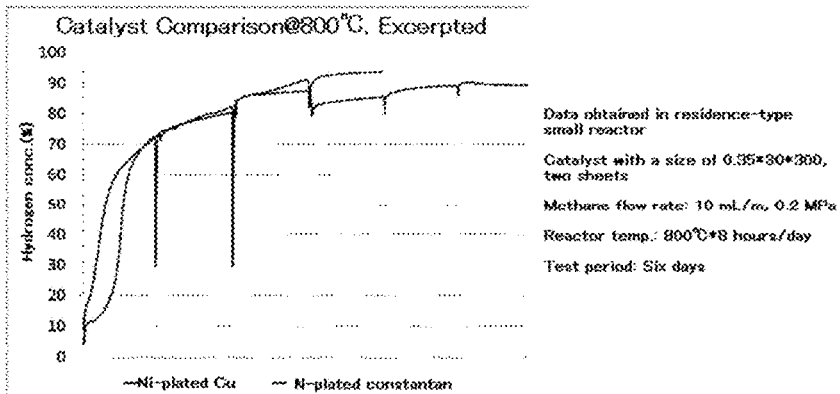
FIG. 9A is a change of catalyst performance of a Ni-plated constantan sheet.
Figure 9B:
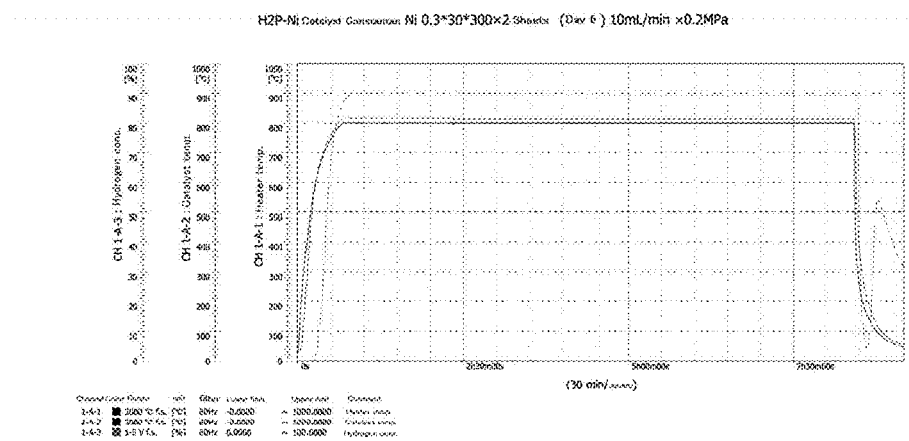
FIG. 9B is a result of data logger on the final date of a Ni-plated constantan sheet.

Example 8—A Test of the Change in Catalyst Performance of a Ni-Plated Constantan By use of constantan sheet used in Example 7 subjected to Ni plating in a condition similar to Example 3 as a sheet catalyst, the hydrogen production efficiency was investigated in a condition similar to Example 1. The result is shown in FIG. 9A and FIG. 9B. The hydrogen production efficiency has converged to 90%.

As shown in FIG. 7 and FIG. 9, it was found that the hydrogen production efficiency of Ni-plated catalyst was drastically improved if the support layer was copper or copper alloy. Further, as shown in FIG. 8, it was found that copper-nickel alloy itself had a high catalyst performance.

Figure 10:
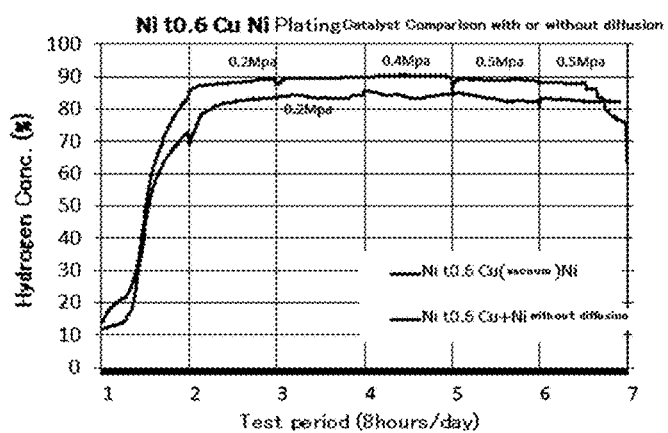
FIG. 10 is a graph showing a time course of hydrogen production efficiency of a catalyst obtained by subjecting Cu plated on a Ni sheet to a diffusion treatment in vacuum and subjecting the sheet to Ni plating.

Example 9—A Catalyst Obtained by Subjecting a Ni Sheet to a Cu Diffusion Treatment in Vacuum and Subjecting to Ni Plating A nickel sheet having a thick 0.6 mm*width 30 mm*length 300 mm was subjected to 1 to 2 μm-thick copper plating, which was followed by a diffusion treatment in vacuum furnace at 900° C. for 13 hours. A treated surface of the obtained sheet was investigated by X-ray diffraction apparatus. No copper was detected on the surface as a consequence of the diffusion of the plated copper into the nickel sheet. This treated surface was further subjected to 10 μm-thick Ni plating for the use as a sheet catalyst, which was maintained at an inner pressure of 0.2 MPa for three days, subsequently at 0.4 MPa for one day and at 0.5 MPa for two days. The hydrogen production efficiency was investigated in a condition similar to Example 1. The result is shown in FIG. 10. The hydrogen production efficiency has drastically increased in four to eight hours and converged to 90% on Day 3. Thereafter, methane supplying pressure was elevated in stages to 0.4 MPa on the Day 4 test, and 0.5 MPa on the Day 5 test, resulting in almost no change in the hydrogen production efficiency. Furthermore, on Day 6, the elevation test of the flow rate was conducted. The hydrogen production efficiency fell within 88.0% to 82.7% from 10 ml/min to 30 ml/min. The hydrogen concentration was decreased and made unstable at 40 ml/min. The above result showed less deterioration of the catalytic performance even when an average residence time was decreased to one third, so that the sufficient hydrogen production efficiency could be maintained.

Figure 11:
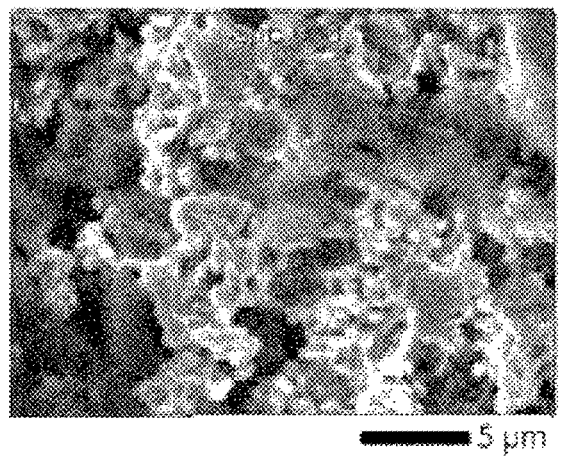
FIG. 11 is a microscopic image of a surface of a catalyst obtained by combusting and removing carbon adhered to the surface after the completion of the experiment.

After the completion of the experiment, carbon attached to the surface was combusted and removed in air by electrothermal heater. The surface of the obtained catalyst was observed and the surface thereof was changed into a monolith structure as shown in FIG. 11.

As shown in FIG. 10, the catalyst that underwent a diffusion treatment did not only improve the hydrogen production efficiency but also improved the initial rise of the catalytic action compared to the catalyst that did not undergo a diffusion treatment (83%).

Figure 12:
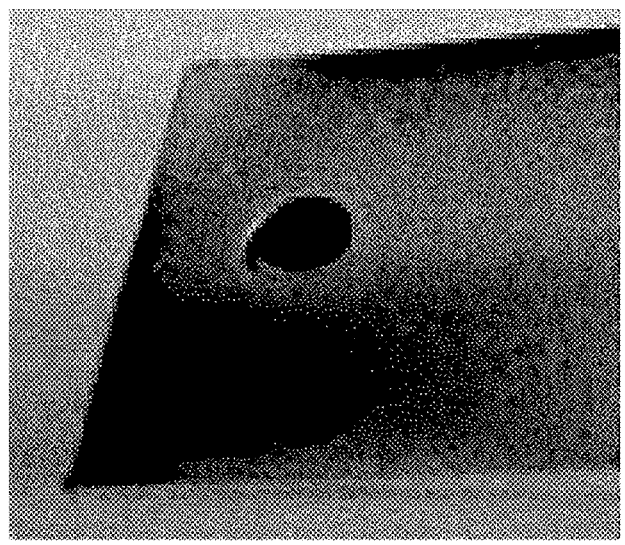
FIG. 12 is an image of a diffusion-treated surface after a diffusion treatment.
Figure 13:
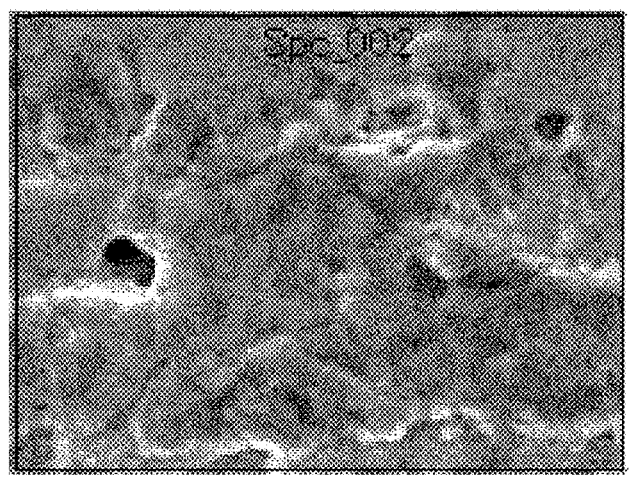
FIG. 13 is a microscopic image of a diffusion-treated surface after a diffusion treatment.
Figure 14:
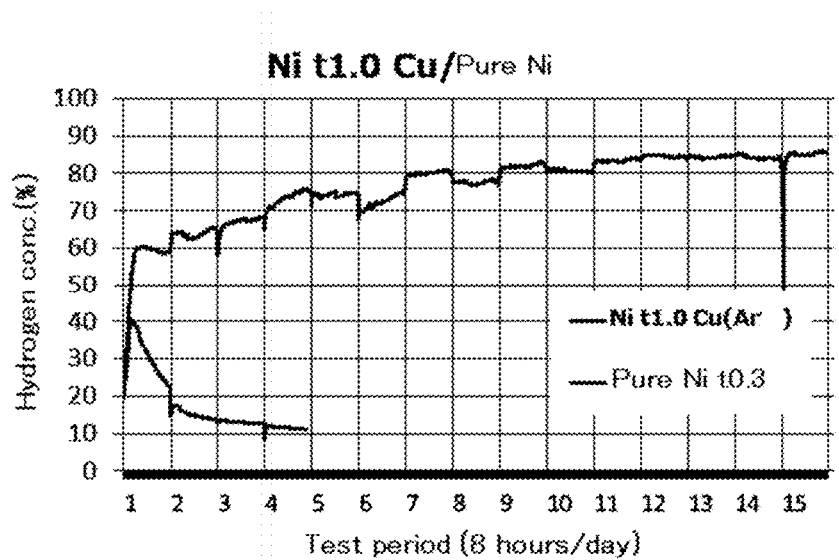
FIG. 14 is a graph showing a time course of hydrogen production efficiency of a catalyst obtained by subjecting Cu plated on a Ni sheet to a diffusion treatment in Ar.

Example 10—A Catalyst Obtained by Subjecting a Ni Sheet to a Cu Diffusion Treatment in Ar Atmosphere A nickel sheet having a thick 1.0 mm*width 30 mm*length 300 mm was subjected to 1 to 2 μm-thick copper plating, which was followed by diffusion treatment in Ar gas. A treated surface of the obtained sheet as shown in FIG. 12 and FIG. 13 was investigated by X-ray diffraction apparatus (K-line). No copper was detected on the surface. By use of this as a sheet catalyst, the hydrogen production efficiency was investigated in a condition similar to Example 1. The result is shown in FIG. 14. The hydrogen production efficiency has drastically increased in four to eight hours and finally converged to about 85%. This demonstrated a drastic improvement on the properties compared to the result of Example 1 (pure Ni sheet) listed on FIG. 14. It is contemplated that the diffusion of Cu into a nickel sheet surface caused the change in a nickel superficial part.

One of ordinary skill in the art would understand that the embodiments for carrying out the present disclosure are not at all limited to the above explicitly described embodiments. In addition, all the elements explained in the above embodiments are not essential elements for the present disclosure. The present disclosure may go through various modifications insofar as the modifications fall within the technical scope and to the extent that falls within the technical idea.

INDUSTRIAL APPLICABILITY

The hydrogen producing apparatus equipped with catalyst for the decomposition of hydrocarbons of the present disclosure may be followed by an apparatus that increases the purity of hydrogen contained in a produced gas, which allows us to apply for hydrogen supply to fuel cell cars equipped with polymer electrolyte fuel cell (PEFC) via on-site station etc.

Further, in recent years, the spotlight is on Solid Oxide Fuel Cell (SOFC) that is capable of directly utilizing methane via city gas infrastructure in addition to hydrogen. In SOFC, there has been a concern regarding the decrease in performance due to an electrode reaction inhibiting effects caused by the precipitation of carbon produced from the thermal decomposition reaction of methane on a metal nickel surface or the adsorption of a produced CO on a metal nickel surface (Satoh et al., "Fuel Cells—From a viewpoint of methane utilization techniques", J. Plasma Fusion Res. Vol. 87, No. 1, (2011) pp. 36-41). The use of the hydrogen producing apparatus equipped with catalyst for the decomposition of hydrocarbons of the present disclosure as a fuel modifier disposed in the upstream of SOFC may result in the decrease in precipitated carbon in SOFC or a longer lifetime of the catalyst.

EXPLANATION OF SYMBOLS

1 Small reactor
2 Heater
3 Catalyst
4 Methane supplying pipe
5 Thermocouple
6 Gas analyzer
8 Discharging pipe of produced gas

The invention claimed is:

1. A catalyst for decomposition of hydrocarbons, the catalyst comprising:
a catalyst raw material including a nickel-containing layer which is exposed on a support layer, wherein
the nickel-containing layer includes:
nickel alone, or
in addition to nickel, one or more elements selected from the group consisting of Rh, Ru, Ir, Pd, Pt, Re, Co, Fe, Cr, Al, Mo, Nb, Ti, W, Ta, and P,
the catalyst is produced by contacting the catalyst raw material with methane gas at an elevated temperature of 800° C. for 4 to 72 hours, and an average residence time of the methane gas is beyond 14 minutes, and
the support layer is iron-nickel alloy, copper or copper alloy.

2. A catalyst for decomposition of hydrocarbons, the catalyst comprising:
a nickel-containing layer exposed on a support layer, wherein
the nickel-containing layer includes:
nickel alone, or
in addition to nickel, one or more elements selected from the group consisting of Rh, Ru, Ir, Pd, Pt, Re, Co, Fe, Cr, Al, Mo, Nb, Ti, W, Ta, and P, and
the support layer consists of:
nickel or iron-nickel alloy, and
copper diffused into a surface of the support layer.

3. The catalyst of claim 2, wherein the catalyst is produced by plating copper on the surface of the support layer and subjecting the support layer to a diffusion treatment in vacuum, nitrogen gas or argon gas.

4. The catalyst of claim 3, further comprising a further nickel-containing layer on the support layer.

5. A process of producing a catalyst of claim 2 for decomposition of hydrocarbons, the process comprising the steps of:
plating copper on the surface of said support layer, and
subjecting said support layer to a diffusion treatment in vacuum, nitrogen gas or argon gas so that copper diffuses into the support layer.

6. A process of producing a catalyst for decomposition of hydrocarbons, the process comprising the steps of:
contacting a catalyst raw material with methane gas at an elevated temperature of 800° C. for 4 to 72 hours, wherein
an average residence time of the methane gas is beyond 14 minutes,
the catalyst raw material comprises a nickel-containing layer which is exposed on a support layer,
the catalyst comprises the catalyst raw material including the nickel-containing layer which is exposed on the support layer,
the nickel-containing layer includes:
nickel alone, or
in addition to nickel, one or more elements selected from the group consisting of Rh, Ru, Ir, Pd, Pt, Re, Co, Fe, Cr, Al, Mo, Nb, Ti, W, Ta, and P, and
the support layer is iron-nickel alloy, copper or copper alloy.

* * * * *